US012624654B2

(12) United States Patent
Raman et al.

(10) Patent No.: US 12,624,654 B2
(45) Date of Patent: May 12, 2026

(54) STRATIFIED NITROGEN ENRICHED AIR (NEA) STRATEGIES AND METHODS TO REDUCE NOx EMISSIONS FROM ENGINES

(71) Applicant: SAUDI ARABIAN OIL COMPANY, Dhahran (SA)

(72) Inventors: Vallinayagam Raman, Dhahran (SA); Jaeheon Sim, Dhahran (SA); Junseok Chang, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 176 days.

(21) Appl. No.: 18/423,048

(22) Filed: Jan. 25, 2024

(65) Prior Publication Data

US 2025/0243799 A1 Jul. 31, 2025

(51) Int. Cl.

*F02B 3/06* (2006.01)
*F02B 47/00* (2006.01)
(Continued)

(52) U.S. Cl.

CPC ................ *F02B 3/06* (2013.01); *F02B 47/00* (2013.01); *F02M 25/00* (2013.01); (Continued)

(58) Field of Classification Search

CPC .................. F02B 3/06; F02B 2075/027; F02B 2075/125; F02B 41/00; F02B 47/00; F23L 2900/07001; F02M 25/00
See application file for complete search history.

(56) References Cited

U.S. PATENT DOCUMENTS 7,377,272 B2 5/2008 Davidson
7,455,046 B2 11/2008 Biruduganti et al.
(Continued)

FOREIGN PATENT DOCUMENTS

CN 101737212 B 1/2013
DE 102019209742 A1 1/2021
(Continued)

OTHER PUBLICATIONS

Baskar et al., "Nitrogen enriched air for NOx reduction in Diesel engine," IOP Publishing-Materials Science and Engineering, vol. 1123, May 12, 2021, 9 pages.
(Continued)

*Primary Examiner* — Jacob M Amick

(74) *Attorney, Agent, or Firm* — Osha Bergman Watanabe & Burton LLP

(57) ABSTRACT

A method for injecting nitrogen into an internal combustion engine cylinder includes moving a piston back and forth in a cylinder and injecting pure nitrogen into a combustion chamber during the compression stroke. The method includes injecting the fuel and nitrogen into different regions to create a stratified gas environment, igniting the fuel, and releasing exhaust emissions. An engine system for injecting nitrogen into an internal combustion engine includes a cylinder, a first intake line, one or more nitrogen injectors,
(Continued)

and a fuel injector. An engine system for injecting nitrogen into an internal combustion engine includes a cylinder, an intake line, and a multi-nozzle injector with a fuel nozzle and a nitrogen nozzle.

20 Claims, 12 Drawing Sheets

(51) Int. Cl.
*F02M 25/00* (2006.01)
*F02B 75/02* (2006.01)
*F02B 75/12* (2006.01)

(52) U.S. Cl.
CPC ... *F02B 2075/027* (2013.01); *F02B 2075/125* (2013.01); *F23L 2900/07001* (2013.01)

(56) References Cited

U.S. PATENT DOCUMENTS

| | | | | |
|---|---|---|---|---|
| 10,378,427 | B2 | 8/2019 | Chang et al. | |
| 2002/0104518 | A1* | 8/2002 | Keefer ................... | F02M 25/10 123/585 |
| 2010/0229841 | A1 | 9/2010 | Nakayama et al. | |
| 2013/0032123 | A1 | 2/2013 | Kinugawa et al. | |
| 2016/0265492 | A1 | 9/2016 | Powell et al. | |

FOREIGN PATENT DOCUMENTS

| | | | |
|---|---|---|---|
| JP | 2006274944 | A | 10/2006 |
| JP | 2009074488 | A | 4/2009 |
| JP | 4302475 | B2 | 7/2009 |

OTHER PUBLICATIONS

Callaghan et al., "Nitrogen Enriched Intake Air Supplied by High Flux Membranes for the Reduction of Diesel NOx Emissions," SAE Technical Paper Series 980177, Feb. 23, 1998, 10 pages.
Che et al., "Research on the Stratified Charge Control of the Nitrogen-Enriched Intake Air," Applied Mechanics and Materials, vol. 328, Jun. 27, 2013, pp. 1021-1025, 6 pages.
Peterson et al., "Spray-induced temperature stratification dynamics in a gasoline direct-injection engine," ScienceDirect, Proceedings of the Combustion Institute 35, Jul. 26, 2014, pp. 2923-2931, 9 pages.
K. Stork and R. Poola, "Membrane-Based Air Composition Control for Light-Duty Diesel Vehicles: A Benefit and Cost Assessment," United States Department of Energy, Oct. 1998, 47 pages.
Su et al., "Review of Stratified Charge Research in Oxygen-enriched and Nitrogen-enriched Combustion," Advanced Materials Research, vol. 538, Jun. 14, 2012, pp. 2457-2460, 5 pages.
International Search Report issued in corresponding International Application No. PCT/US2025/012067; mailed Apr. 11, 2025 (5 pages).
Written Opinion of the International Searching Authority issued in corresponding International Application No. PCT/US2025/012067; dated Apr. 11, 2025 (8 pages).
Yinga, J. et al. "Nitrogen-rich intake air is beneficial to engine NOx Emissions and Performance Impact" Automotive Engineering 2010 vol. 32 Issue 9 (10 pages).

* cited by examiner

STRATIFIED NITROGEN ENRICHED AIR (NEA) STRATEGIES AND METHODS TO REDUCE NOx EMISSIONS FROM ENGINES

BACKGROUND

Internal combustion engines emit gaseous pollutants such as carbon monoxide (CO), carbon dioxide ($CO_2$), unburned hydrocarbons, nitrogen oxide ($NO_x$) as well as solid pollutants such as particulate matter. As legislation has tightened the rules for vehicle emissions, new exhaust purification systems have been developed to reduce emissions. Environmental concerns and government regulations have led to efforts focused on improving the removal of combustion by-products and exhaust pollutants from vehicle engine exhaust gases.

Nitrogen in a combustion chamber of an internal combustion engine may decrease the combustion rate and thus decrease NOx emissions. Accordingly, there exists a need for a process of including nitrogen in an internal combustion engine to reduce NOx emissions while maintaining engine efficiency.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to methods for injecting nitrogen into an internal combustion engine. The internal combustion engine has an axially moving piston in a cylinder moving between a top dead center position and a bottom dead center position in a cycle containing an intake stroke, a compression stroke, a combustion stroke, and an exhaust stroke. The methods may include injecting pure nitrogen into a combustion chamber of the cylinder before the piston reaches top dead center during the compression stroke. The fuel is injected into a different region of the combustion chamber from where the pure nitrogen is injected to create a stratified gas environment within the combustion chamber. The fuel in the stratified gas environment is ignited and exhaust emissions are released from combustion of the fuel during the exhaust stroke.

In another aspect, embodiments disclosed herein relate to engine systems for injecting nitrogen into an internal combustion engine including a cylinder with a combustion chamber and a piston slidably positioned in the cylinder. The system includes a first intake line fluidly connected to the combustion chamber through a first intake port. One or more nitrogen injectors fluidly connect a source of pure nitrogen to the combustion chamber and a fuel injector fluidly connects a fuel source to the combustion chamber.

In another aspect, embodiments disclosed herein relate to engine systems for injecting nitrogen into an internal combustion engine with a cylinder comprising a combustion chamber and a piston slidably positioned in the cylinder. An intake line fluidly connects to the combustion chamber through an intake port. A multi-nozzle injector is connected to the cylinder containing a fuel nozzle fluidly connecting a fuel source to the combustion chamber and a nitrogen nozzle fluidly connecting a source of pure nitrogen to the combustion chamber.

In another aspect, embodiments disclosed herein relate to engine systems for injecting nitrogen into an internal combustion engine including a cylinder comprising a combustion chamber, a piston slidably positioned in the cylinder, first intake line fluidly connected to the combustion chamber through a first intake port, and a second intake line fluidly connected to the combustion chamber through a second intake port. One or more nitrogen injectors fluidly connects a source of pure nitrogen to the first and the second intake line and a fuel injector fluidly connects a fuel source to the combustion chamber.

Any combinations of the various embodiments and implementations disclosed herein can be used in a further embodiment, consistent with the disclosure. Other aspects and advantages of the claimed subject matter will be apparent from the following description and the appended claims.

BRIEF DESCRIPTION OF DRAWINGS

Wherever possible, like or identical reference numerals are used in the figures to identify common or the same elements. The figures are not necessarily to scale and certain features and certain views of the figures may be shown exaggerated in scale for purposes of clarification.

DETAILED DESCRIPTION

In one aspect, embodiments disclosed herein relate to methods for injecting nitrogen into selected regions of an internal combustion engine cylinder. In another aspect, embodiments disclosed herein relate to engine systems for injecting nitrogen into selected regions of an internal combustion engine using a separate nitrogen injector from a fuel injector. In another aspect, embodiments disclosed herein relate to engine systems for injecting nitrogen into selected regions of an internal combustion engine using a multi-nozzle injector for injecting both nitrogen and fuel. In another aspect, embodiments disclosed herein relate to engine systems for injecting nitrogen into selected regions of an internal combustion engine through one or more air intakes.

Figure 1A:
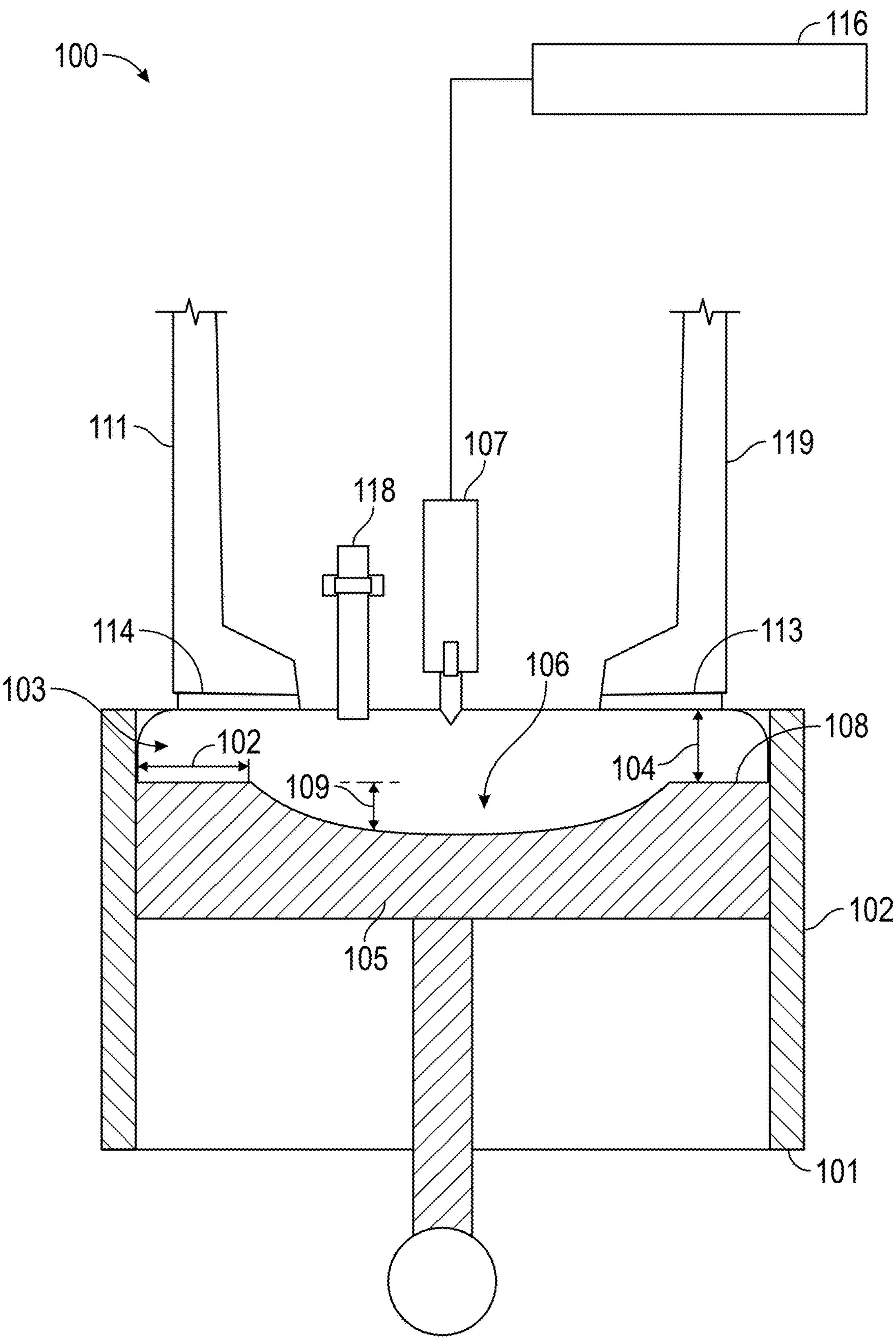
FIG. 1A is a schematic view of a cylinder in an internal combustion engine in accordance with one or more embodiments.

An example of an internal combustion engine according to embodiments of the present disclosure is shown in FIG. 1A, where the engine 100 includes a cylinder 101. One cylinder is shown in FIG. 1A, however, engines according to embodiments of the present disclosure may include more than one cylinder. In many automotive applications, a vehicle may contain between 4 to 12 cylinders, though more or less is possible. Each cylinder 101 contains a piston 105 slidably positioned therein and a combustion chamber 103 defined within the cylinder between the piston head and the top of the cylinder. Thus, as the piston 105 moves axially back and forth in the cylinder, from a top dead center position to a bottom dead center position, the size of the combustion chamber 103 changes correspondingly.

Figure 1B:
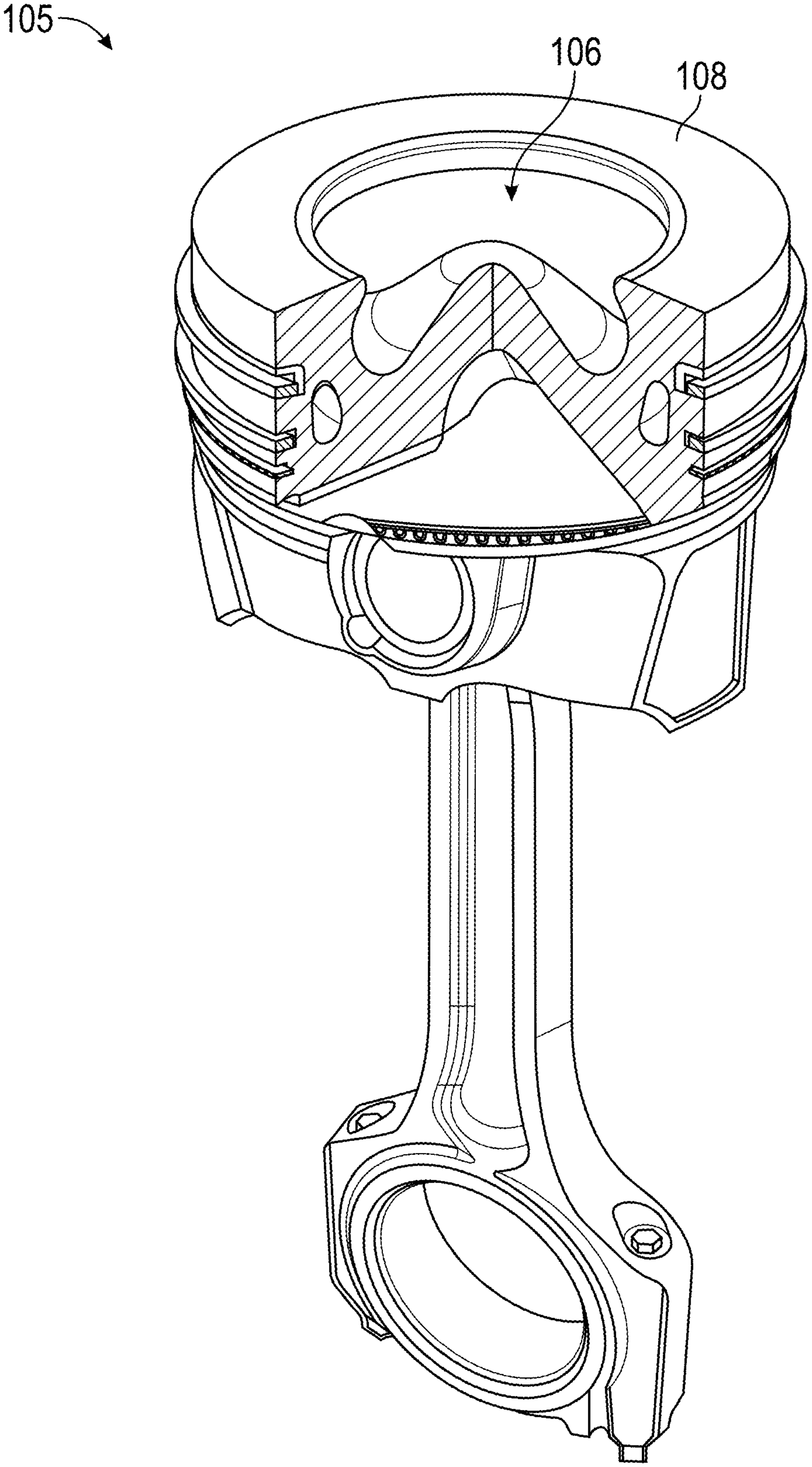
FIG. 1B is a three-dimensional depiction of a piston bowl with an annular depression formed in the top surface.
Figure 1C:
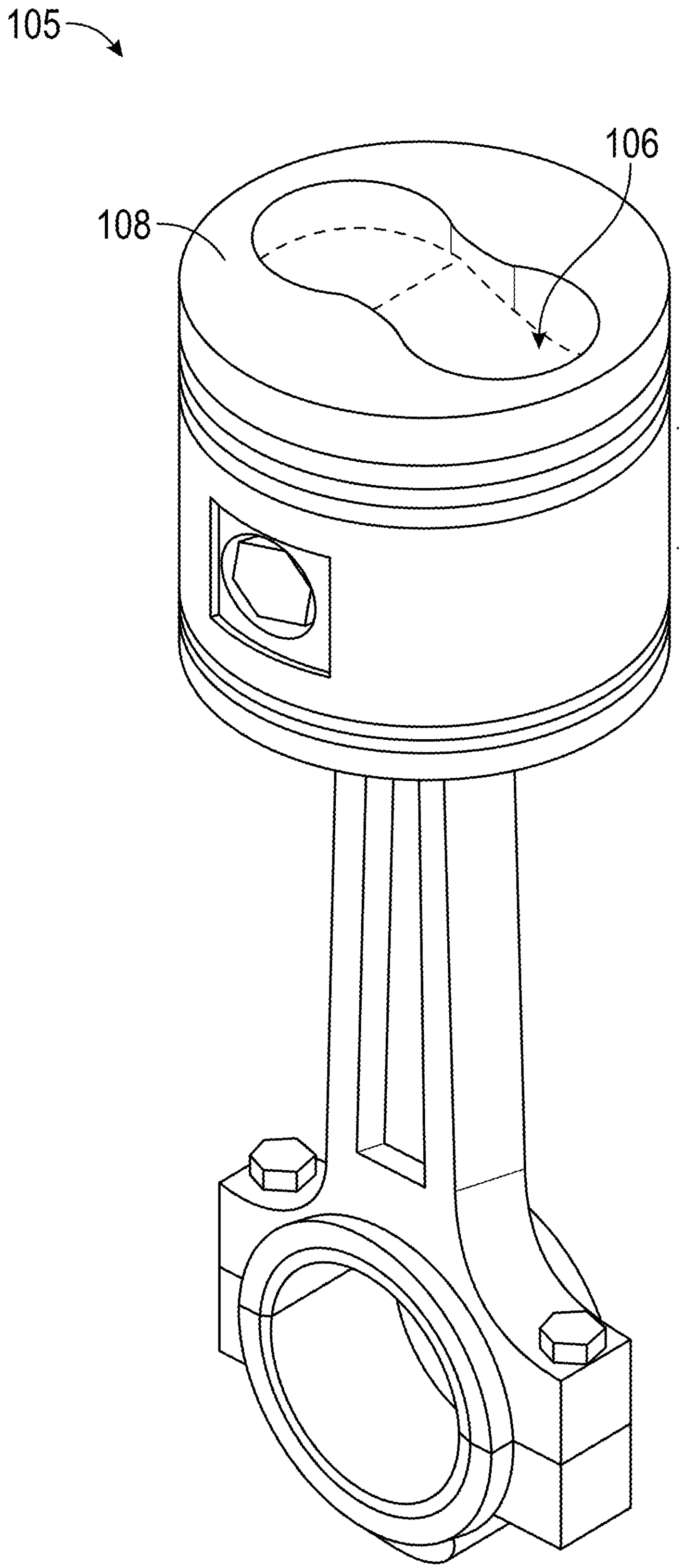
FIG. 1C is a three-dimensional depiction of a piston bowl with a multi-lobed depression formed in the top surface.

In diesel engines, the piston 105 may have a depressed geometry formed in the center of the piston, which may be referred to as a piston bowl. In FIG. 1A, the piston 105 has a piston bowl 106 with a contoured depression geometry formed in the center of piston head's top surface 108. The piston bowl can contain one or more contoured depressions formed into the top surface. Though FIG. 1A shows a uniform semi-spherical contoured depression, other piston bowl geometries are possible, including but not limited to shapes such as annular depressions or multi-lobed depression shapes. For example, FIG. 1B shows an example of a piston 105 having a piston bowl 106 with a geometry of an annular depression formed in the top surface 108. FIG. 1C shows an example of a piston 105 having a piston bowl 106 with a multi-lobed depression geometry formed in the top surface 108. The depression depth 109 of the piston bowl 106 (measured in an axial direction between the surface of the piston bowl and the top surface 108 bordering the piston bowl) may vary along its area. Piston head geometries may further include a relatively planar top surface 108 extending around and defining the perimeter a piston bowl 106. When the piston 105 is in a top dead center position, the distance between the piston's top surface 108 and the cylinder head fire deck may be referred to as the squish height 104. The radial distance of the piston's top surface 108 extending from the piston bowl 106 to the outer perimeter of the top surface 108 may be referred to as the squish width 102.

A fuel supply and an air supply are fluidly connected to each combustion chamber 103 to provide the necessary components for combustion to occur. Air may be supplied to each combustion chamber 103 through one or more intake lines 119 (e.g., from an intake manifold) and intake port(s) through the cylinder, where an intake valve 113 positioned in each intake port is opened/closed to selectively allow air into the combustion chamber 103 at selected times. Fuel may be supplied to the combustion chamber via a fuel injector 107, which may be connected, for example, to the top of the cylinder, such as shown in FIG. 1A. In some embodiments, the fuel may be injected into a prechamber, which subsequently ejects into the combustion chamber. A prechamber may be a relatively small, enclosed chamber (e.g., less than ¼ the volume of the combustion chamber), typically formed in the cylinder head, that has one or more holes or nozzles fluidly communicating the prechamber to the main combustion chamber.

The piston 105 may move in the cylinder (via rotation of a connected crankshaft) in a four-stroke cycle, including an intake stroke, a compression stroke, a combustion stroke (sometimes referred to as an expansion stroke), and an exhaust stroke. During the intake stroke, the piston moves in a direction from top dead center (closer to the top of the cylinder) to bottom dead center (closer to the crankshaft), during which air may flow into the combustion chamber 103 via open intake valve(s) 113. During the compression stroke, the intake valve(s) may be closed and the piston 105 moves in an opposite axial direction. Fuel may be injected into the combustion chamber 103 during the intake stroke or the compression stroke. As the piston 105 moves in the compression stroke, the piston 105 compresses and mixes the fuel and air mixture in the combustion chamber 103. The compressed fuel and air mixture may then be ignited (e.g., by a spark plug or by compression), thereby combusting the fuel. The combustion may power the combustion stroke of the piston 105, moving the piston 105 in the direction from top dead center to bottom dead center. The piston 105 may then move in the opposite axial direction for the exhaust stroke, during which the combustion exhaust is pushed out of opened exhaust valve(s) 114 through the exhaust line(s) 111.

Both a compression ignition (CI) engine and a spark ignition (SI) engine may be used in this application. In a compression ignition engine, fuel and air are compressed under high pressure conditions without an additional ignition source in the combustion process. An example of a common compression ignition engine is a diesel engine. In a spark ignition engine, fuel and air are ignited with a spark plug. When a spark ignition engine is used, at least one spark plug will be present in each cylinder.

According to embodiments of the present disclosure, nitrogen may be injected into the cylinder during the compression stroke before the piston reaches top dead center in different concentrations depending on engine type, fuel type, and required $NO_x$ emission reduction to provide different partial regions within the combustion chamber having different concentrations of nitrogen ranging from 78% to 85%. In embodiments described herein, nitrogen injection may refer to injection of pure nitrogen, having a purity of greater than 99.0% $N_2$.

In some embodiments, the nitrogen may be directly injected into the combustion chamber using one or more nitrogen injectors that may be located on a top of the cylinder or on a side of the cylinder. In embodiments with a prechamber used to combust a portion of the fuel before ejecting to the combustion chamber, the nitrogen is injected into the combustion chamber, and not the prechamber. The nitrogen injector may include a pressurized tube extending through the cylinder wall to carry nitrogen from a nitrogen source directly into the combustion chamber within the cylinder. In direct nitrogen injection embodiments, different regions of the cylinder may be targeted by orienting and positioning one or more nitrogen injectors around the cylinder to create nitrogen stratified areas within the combustion chamber, e.g., including injecting nitrogen directly into a piston bowl area, into a cylindrical region extending from a piston bowl to a top of a cylinder, or into a spherical region around an injector region. Controllable parameters specific to direct nitrogen injection include, for example, the nitrogen injector direction/orientation in the cylinder, the number of nitrogen injector nozzles and nitrogen injector nozzle orientation, nitrogen injection pressure, nitrogen injection timing, and nitrogen injection duration. These controllable parameters may be manipulated to target nitrogen injection into specific areas in the combustion chamber and with specific nitrogen volumes to provide nitrogen stratification within the combustion chamber.

Figure 1E:
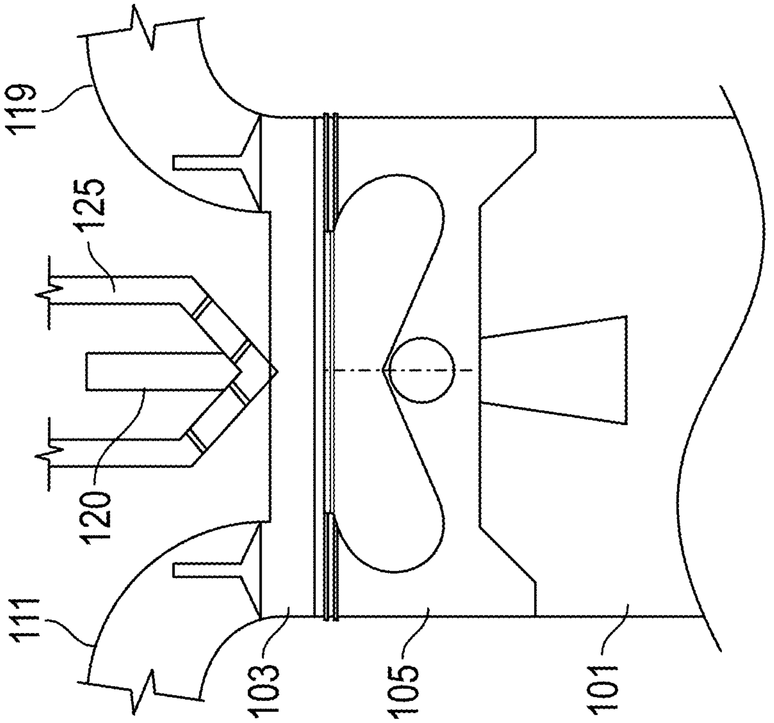
FIG. 1E is a schematic view of a cylinder in an internal combustion engine with a multi-nozzle injector in accordance with one or more embodiments.
Figure 1D:
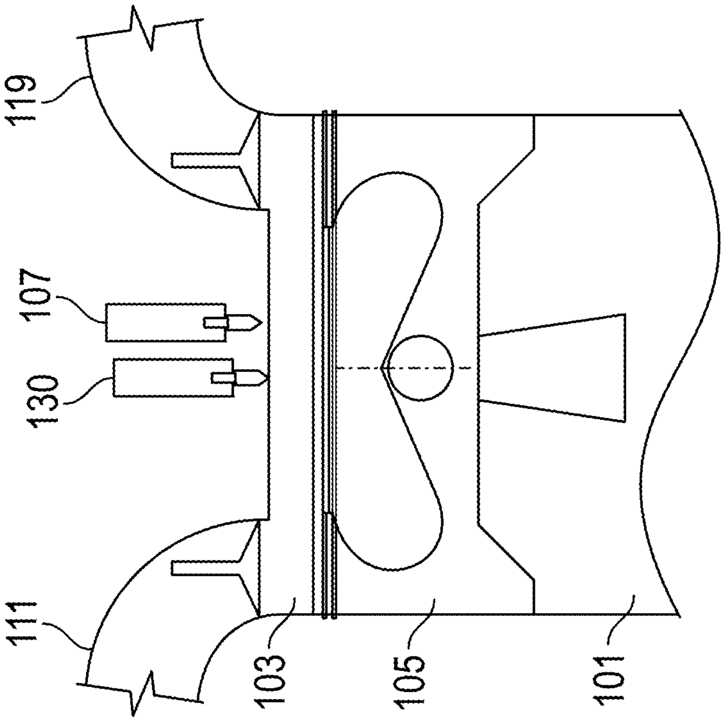
FIG. 1D is a schematic view of a cylinder in an internal combustion engine with separate nitrogen and fuel injectors in accordance with one or more embodiments.

The injection of nitrogen and fuel in different regions of a combustion chamber according to embodiments of the present disclosure may create a stratified gas environment in different regions within the combustion chamber. In some embodiments, the nitrogen and fuel are injected directly into the combustion chamber 103 from separate locations along the cylinder 101, using a separate nitrogen injector 130 and a separate fuel injector 107, as illustrated in FIG. 1D. As illustrated in both FIG. 1D and FIG. 1E, throughout the operation of the engine, air may flow into the combustion chamber 103 via the intake line 119 and combustion exhaust may be pushed out of the exhaust line 111 as the piston 105 moves. Depending on the region within the combustion chamber selected to have a relatively higher concentration of nitrogen and the nitrogen stratification design, one or more nitrogen injectors may be positioned around the combustion chamber in a corresponding location and orientation. For example, a nitrogen injector(s) may be located on the top, the sides, or both the tops and the sides of the cylinder based on the targeted region to produce the nitrogen stratified area. In other embodiments, as illustrated in FIG. 1E, the nitrogen and fuel are injected into the combustion chamber 103 of the cylinder 101 through a multi-nozzle injector with a separate fuel flow path 125 and a separate nitrogen flow path 120 leading to a shared injection location. In other embodiments, the nitrogen is injected into the air intake line while the fuel is injected into the combustion chamber via a separate fuel injector. In other embodiments, the nitrogen is injected into two air intake lines at different concentrations while the fuel is injected into the combustion chamber via a separate fuel injector.

An injection nozzle may be designed with specific k-factors (the flow rating on a fixed or variable nozzle indicating how much flow the nozzle will deliver at a base nozzle pressure) to target certain areas of the combustion chamber. In embodiments using a multi-nozzle injector, the spray angle may be selected and oriented for targeted distribution in a combustion chamber. In one or more embodiments, nozzle outlet direction, injection pressure, injection timing, and injection duration through a nozzle may be controlled to target specific regions in a combustion chamber to create nitrogen stratification.

In some embodiments, nitrogen stratification may be provided in the combustion chamber by unevenly providing nitrogen through multiple air intake lines, e.g., by injecting nitrogen through one air intake port while not injecting nitrogen through the remaining intake port(s) to the combustion chamber. In intake nitrogen injection embodiments, controllable parameters to control the varying amount of nitrogen provided through multiple intake lines may include, for example, selecting which intake line(s) to inject nitrogen in and which intake line(s) to not inject nitrogen in, nitrogen injection amounts, nitrogen injection timing, and intake valve timing.

As used herein, nitrogen stratification in a combustion chamber of a cylinder may refer to an uneven concentration of nitrogen in different regions of the combustion chamber. For example, a nitrogen stratified environment in a combustion chamber may include a high nitrogen concentration region having a concentration of nitrogen ranging from between 80 and 85 percent by volume and a low nitrogen concentration region having an atmospheric concentration of nitrogen of about 78 to 79 percent by volume.

Figure 2A:
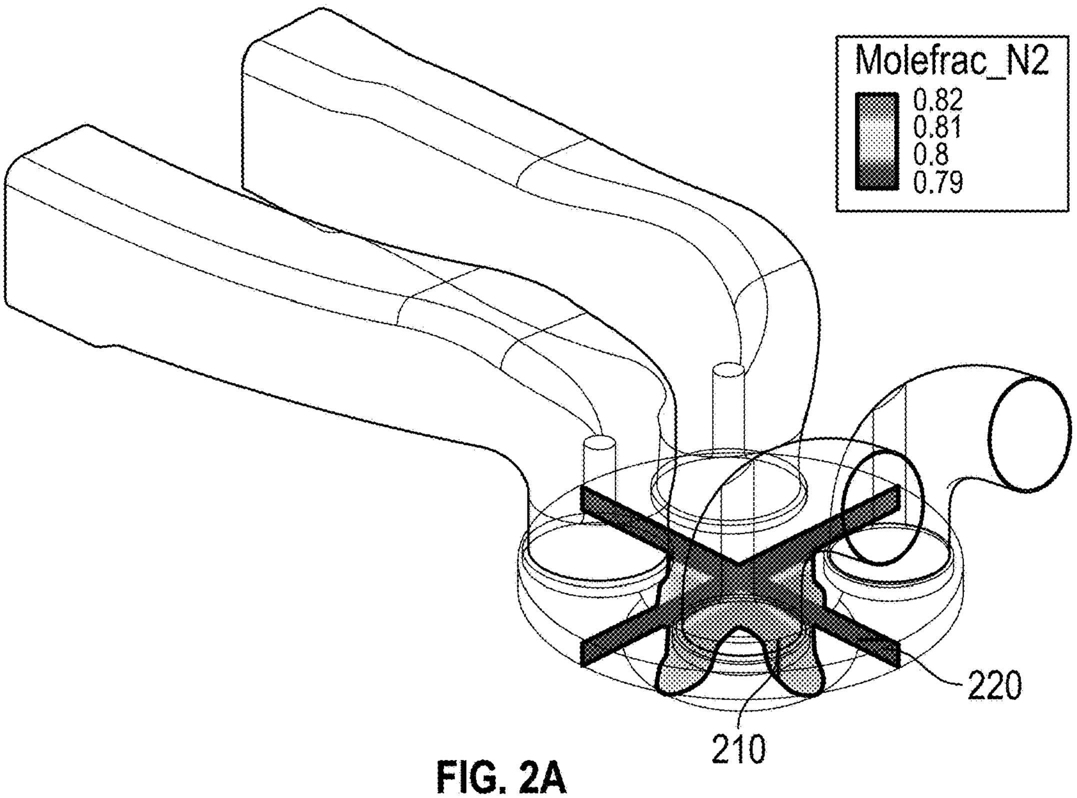
FIGS. 2A-B show schematics depicting nitrogen stratification in a piston bowl in accordance with one or more embodiments.
Figure 2B:
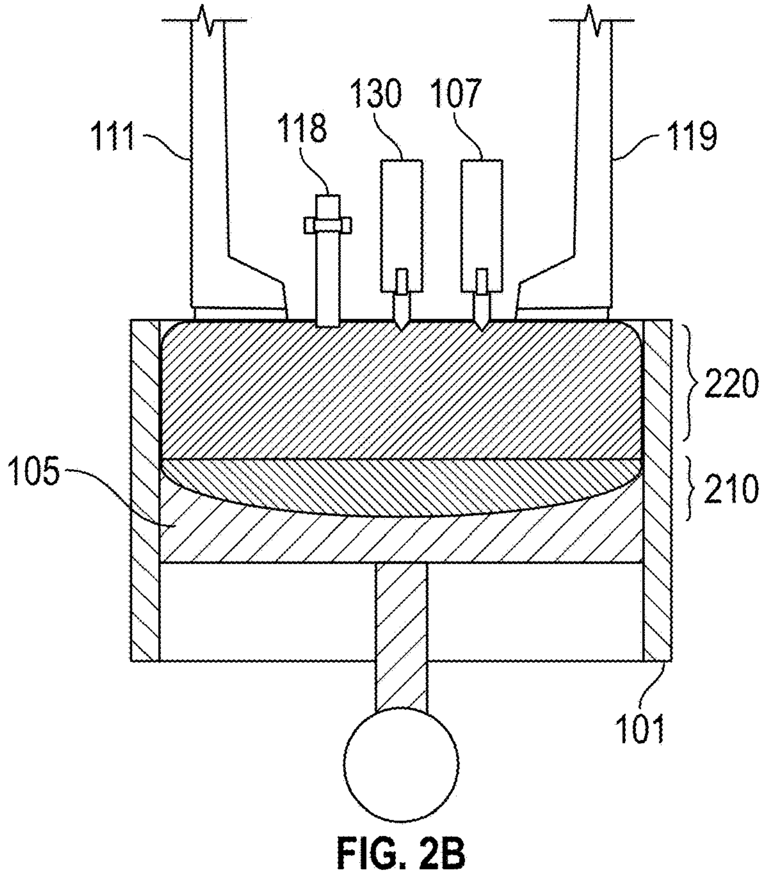

FIGS. 2A-B demonstrate nitrogen stratification between a piston bowl region and the remaining regions in a cylinder's combustion chamber. FIG. 2A shows a perspective view and FIG. 2B shows a cross-sectional view of the nitrogen stratification system. In the embodiment shown, a higher concentration of nitrogen is provided in the piston bowl region of a combustion chamber. In one or more embodiments, a high nitrogen concentration region may be provided in the piston bowl region by directly injecting nitrogen onto a piston bowl formed on the piston head at a nitrogen injection timing ranging from 9 to 11 crank angle degrees (CAD) less than the fuel injection timing for injecting the fuel. The varying shades on the diagram demonstrate different mole fractions of nitrogen. As illustrated, the layers of nitrogen mole fractions range between 0.79 and 0.82, where a high nitrogen concentration region 210 is provided in the piston bowl (a concave region formed in the head of the piston) and a low nitrogen concentration region 220 is provided in the remaining portion of the combustion chamber.

In one or more embodiments, the nitrogen stratification shown in FIGS. 2A-B may be provided by injecting nitrogen into the combustion chamber from a central region of the cylinder head. For example, in FIG. 2B, a nitrogen injector 130 and adjacent fuel injector 107 may be centrally mounted in the cylinder head. The nitrogen injector 130 can be located along a central axis of the cylinder (e.g., as shown in FIG. 2B) and/or several nitrogen injectors may be provided in multi-hole locations around a central region of the cylinder head. Further, the nitrogen injector can be a separate injector as shown in FIG. 2B, or it could be a multi-nozzle injector (e.g., as shown in FIG. 1E) having at least two nozzles in the same injector body to inject fuel and nitrogen from the same injector body through different nozzles. Further, the k-factor, spray angle, nozzle outlet direction, number of nozzle outlets, injection pressure, and/or injection timing and duration of the injector nozzle can be selected to have a selected distribution pattern around the region of injector to direct increased concentrations of nitrogen to the piston bowl region of the combustion chamber. In one or more embodiments, the nitrogen stratification shown in FIGS. 2A-B may be provided by injecting nitrogen at a timing of 10 to 20 CAD before the fuel injection and for a duration of 5 to 10 CAD.

Once formed, the nitrogen stratification environment may be temporarily provided in the combustion chamber according to the timing of engine. For example, when nitrogen is injected right before the main fuel injection, the nitrogen stratification may be provided at the moment of ignition in the combustion chamber, as combustion follows shortly after the fuel injection trajectory by auto-ignition of local air-fuel mixture. Ensuring nitrogen stratification at the moment of fuel injection may thus obtain the nitrogen dilution effect during combustion. Accordingly, nitrogen stratification may not be needed at other times (timing that is outside the above-described timing window prior to combustion) in the cylinder cycle.

To illustrate the efficacy of nitrogen stratification according to embodiments of the present disclosure compared to premixed nitrogen addition to a combustion chamber (premixed NEA), three-dimensional computational fluid dynamics (CFD) simulations were performed using CONVERGE software. Based on diesel engine geometry of a light duty engine, a premixed nitrogen enriched air (NEA) set up was used with 2% enrichment of nitrogen by volume mixed into air (resulting in a nitrogen-air mixture having 81 vol % nitrogen). At 1500 rpm and 10 bar indicated mean effective pressure (IMEP), the NOx emission was reduced to 1.15 g/k Whr with 81 vol % nitrogen concentration compared to the baseline case without nitrogen enrichment (air with an atmospheric nitrogen level of 79 vol % nitrogen). The fuel injection timing was fixed at −10 CAD after top dead center (aTDC) for an injection pressure of approximately 800 bar in a spray dominant mixing controlled diffusion combustion mode. Under these simulation parameters, the premixed nitrogen reduces the in-cylinder temperature by suppressing combustion and thereby decreasing the NOx emissions by up to 27%.

The timing of injecting diesel fuel at −10 CAD aTDC is provided as an example to demonstrate NOX reduction, where nitrogen injection occurs right before the diesel fuel injection to ensure a layered nitrogen distribution. In a typical diesel engine, fuel may be injected closer to TDC (mixing driven combustion). For partially premixed combustion, fuel may be injected later (e.g., −30 or 40 CAD aTDC). The timing may vary, for example, depending on the engine type and operating conditions.

Comparative simulations were conducted for nitrogen stratification in the piston bowl region, as shown in FIGS. 2A-B, under the same operating conditions as the premixed NEA operating conditions described above. In the simulations, nitrogen is directly injected into the piston bowl region at −20 CAD aTDC, and fuel is injected at −10 CAD aTDC, after stratifying the nitrogen in the piston bowl region, to create a nitrogen stratified combustion chamber having a high nitrogen concentration region in the piston bowl with 83 vol % nitrogen and remaining regions in the combustion chamber with 79 vol % nitrogen. The high nitrogen concentration region in the piston bowl with 83 vol % nitrogen and remaining regions in the combustion chamber with 79 vol % nitrogen provide an average nitrogen concentration in the combustion chamber of 81 vol % nitrogen, which is equal to the average nitrogen concentration in the premixed NEA combustion chamber. Although the average nitrogen concentrations for the nitrogen stratified and premixed NEA combustion chambers are the same amount, the simulations demonstrated that the stratification in the piston bowl region reduces the NOx emissions by 7.7% greater than the reduction resulting from the premixed NEA case. The full results are demonstrated below in Table 1.

Figure 3A:
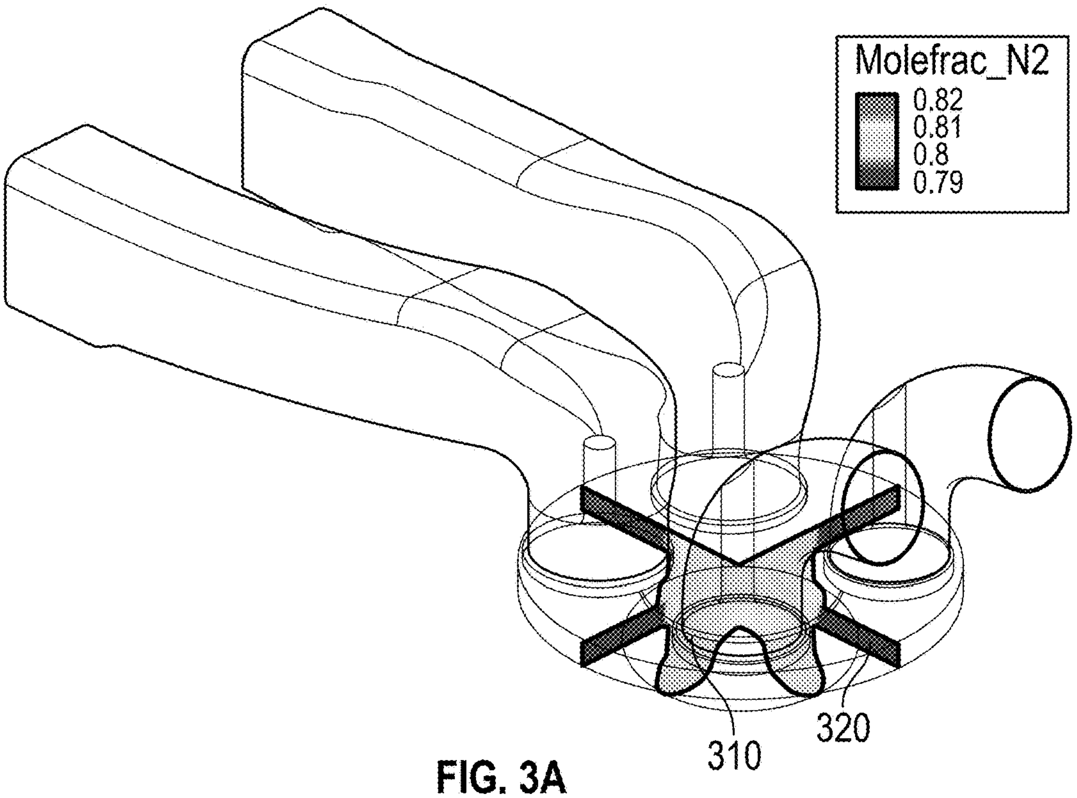
FIGS. 3A-B show schematics depicting nitrogen stratification in a cylindrical region from a piston bowl to a top of a cylinder in accordance with one or more embodiments.
Figure 3B:
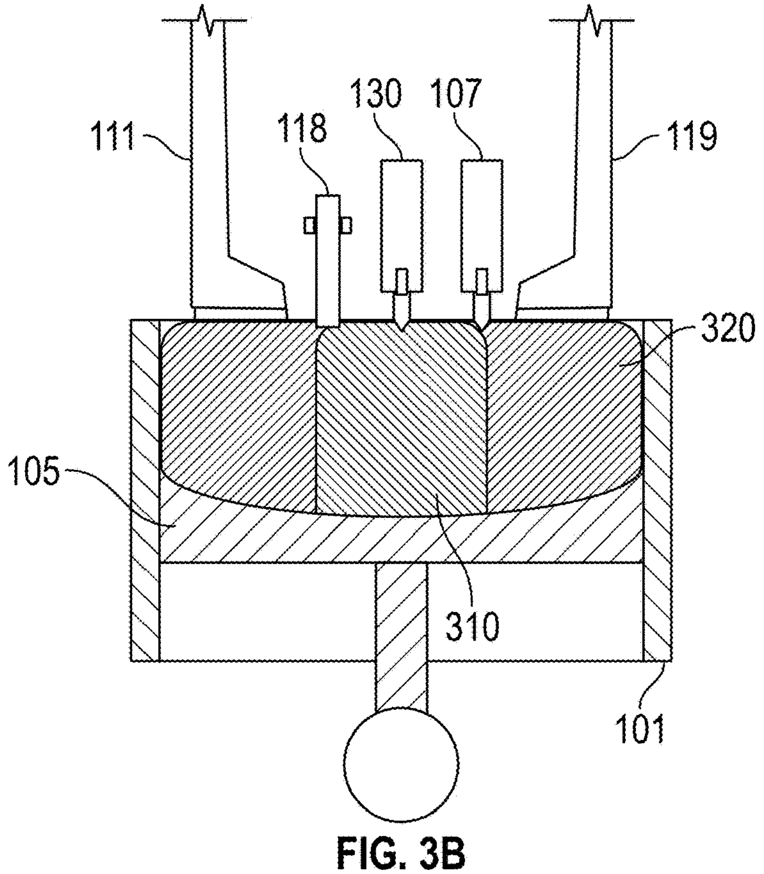

FIGS. 3A-B are schematics depicting nitrogen stratification between a cylindrical region and the remaining regions in a cylinder's combustion chamber, where the cylindrical region is centrally located in the combustion chamber and extends from a piston bowl to a top of a cylinder. FIG. 3A shows a perspective view and FIG. 3B shows a cross-sectional view of the nitrogen stratification system. In the embodiment shown, a higher concentration of nitrogen is provided in the cylindrical region by injecting nitrogen from the top of the cylinder into the combustion chamber. The varying shades demonstrate different mole fractions of nitrogen. As illustrated, the layers of nitrogen mole fractions range between 0.79 and 0.82, where a high nitrogen concentration region 310 is provided in the cylindrical region and a low nitrogen concentration region 320 is provided in the remaining portion of the combustion chamber.

Comparative simulations were repeated for stratification in the cylindrical region from the piston bowl to the top of the cylinder under the same operating conditions as the premixed NEA operating conditions described above. In the comparative simulations, nitrogen is directly injected into the cylindrical region at −20 CAD aTDC, and fuel is injected at −10 CAD aTDC, after stratifying the nitrogen in the cylindrical region, to create a nitrogen stratified combustion chamber having a high nitrogen concentration region in the cylindrical region with up to 83 vol % nitrogen and remaining regions in the combustion chamber with 79 vol % nitrogen. The nitrogen is injected immediately before the fuel injection to ensure the layered distribution. The high nitrogen concentration region in the cylindrical region with up to 83 vol % nitrogen and remaining regions in the combustion chamber with 79 vol % nitrogen provide an average nitrogen concentration in the combustion chamber of 81 vol % nitrogen, which is equal to the average nitrogen concentration in the premixed NEA combustion chamber. Although the average nitrogen concentrations for the nitrogen stratified and premixed NEA combustion chambers are the same amount, the simulations demonstrated that the stratification in the cylindrical region reduced NOx emissions by 25.9% for the stratified case compared to the premixed NEA case. The full results are demonstrated below in Table 1.

Figure 4A:
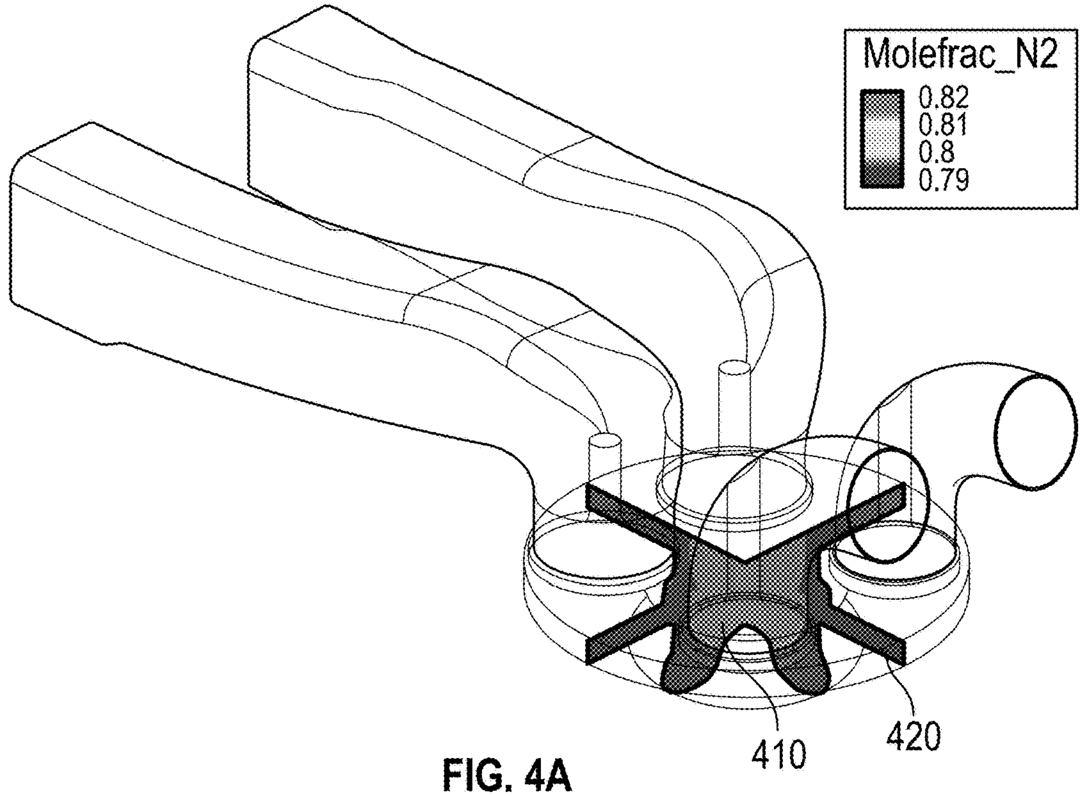
FIGS. 4A-B show schematics depicting nitrogen stratification in a spherical region around an injector region in accordance with one or more embodiments.
Figure 4B:
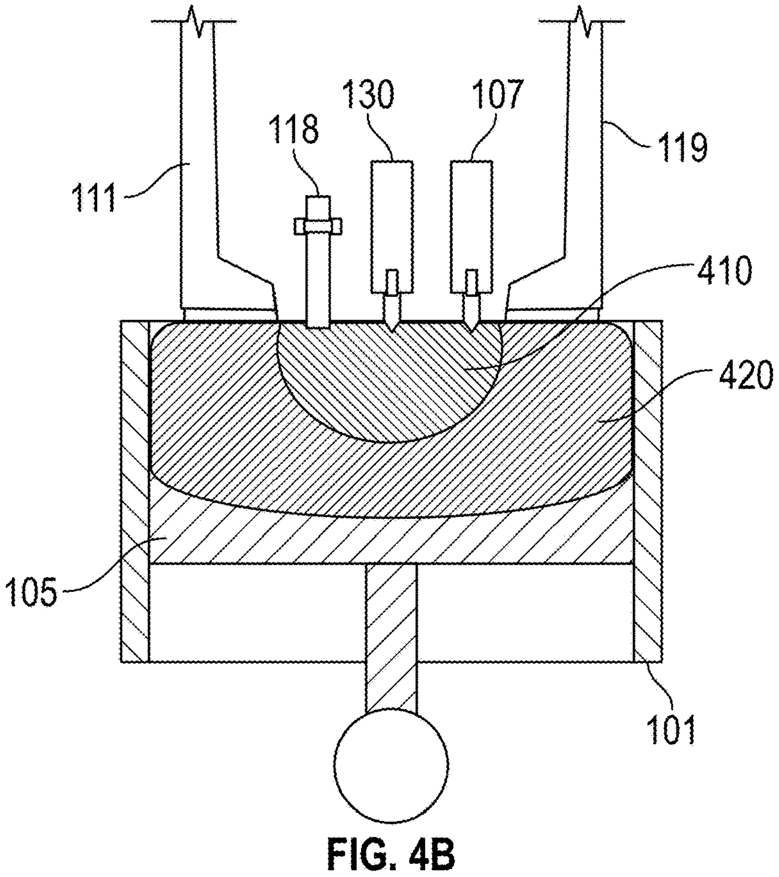

FIGS. 4A-B show schematics depicting nitrogen stratification between a spherical region around a nitrogen injector and the remaining regions in a cylinder's combustion chamber. FIG. 4A shows a perspective view and FIG. 4B shows a cross-sectional view of the nitrogen stratification system. In the embodiment shown, a higher concentration of nitrogen is provided in the spherical region by injecting nitrogen from the top of the cylinder into the combustion chamber. The nitrogen is injected through a centrally located nitrogen injector in the cylinder head.

Further, injection pressure/flow rate and nozzle design may be selected such that nitrogen is sprayed from the injector in a spherical (or semi-spherical) region around the nozzle outlet, as best seen in FIG. 4B. For example, to provide a nitrogen concentrated spherical region, nitrogen may be injected at a relatively slower velocity, longer duration, using more injection nozzles, and/or bigger nozzle size when compared with the same type nitrogen parameters used in other nitrogen stratification embodiments disclosed herein. In some embodiments, more nozzles with a larger nozzle exit area are required for targeting the spherical region to reduce the injection velocity. In one or more embodiments, pure nitrogen may be injected from a nitrogen injector at a top of the cylinder at an injection rate in a range of 25% to 35% that of a standard nitrogen injection rate into the combustion chamber to provide the stratified gas environment with a higher concentration of nitrogen in a spherical region around the nitrogen injector. Specific ranges of nitrogen injection rates and injection durations are illustrated below in Table 2, captured from simulations. The nitrogen injection rate varies based on the engine load and operating conditions.

In such manner, a high nitrogen concentration region 410 is provided in the spherical region and a low nitrogen concentration region 420 is provided in the remaining portion of the combustion chamber. The varying shades demonstrate different mole fractions of nitrogen. In FIG. 4, there are two layers with different nitrogen concentrations, one region 420 containing a mole fraction of 0.79 and another region 410 containing a mole fraction of 0.82.

Comparative simulations were repeated for analyzing performance of nitrogen stratification in the spherical region around the nitrogen injector under the same operating conditions as the premixed NEA operating conditions described above. In the comparative simulations, nitrogen is directly injected into the spherical region at −20 CAD aTDC, and fuel is injected at −10 CAD aTDC, after stratifying the nitrogen in the spherical region, to create a nitrogen stratified combustion chamber having a high nitrogen concentration region in the spherical region with up to 83 vol % nitrogen and remaining regions in the combustion chamber with 79 vol % nitrogen. The nitrogen is injected immediately before the fuel injection to ensure stratified distribution. The high nitrogen concentration region in the spherical region with up to 83 vol % nitrogen and remaining regions in the combustion chamber with 79 vol % nitrogen provide an average nitrogen concentration in the combustion chamber of 81 vol % nitrogen, which is equal to the average nitrogen concentration in the premixed NEA combustion chamber. Although the average nitrogen concentrations for the nitrogen stratified and premixed NEA combustion chambers are the same amount, the simulations demonstrated that the stratification in the spherical region reduced NOx emissions by 31.2% compared to the premixed NEA case. Compared to the non-NEA case, the NOx emissions are reduced by 50%. The full results are demonstrated below in Table 1.

Figure 5:
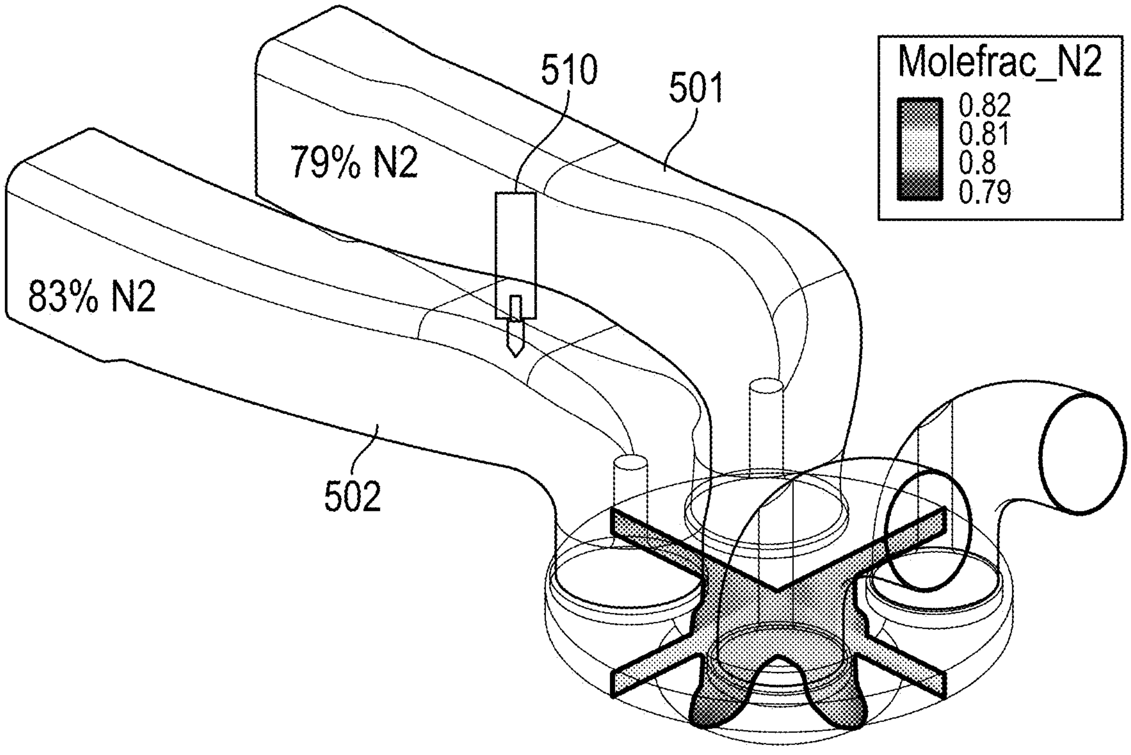
FIG. 5 is a schematic depicting nitrogen stratification through the intake ports in accordance with one or more embodiments.

FIG. 5 is a schematic depicting nitrogen stratification through intake nitrogen injection, where nitrogen injection into a single intake line is used to provide a different concentration of nitrogen in each of two intake ports. In the embodiment shown, air having atmospheric concentrations of nitrogen (e.g., 79 vol %) is directed through a first intake line 501, while a high nitrogen concentration gas (e.g., having a nitrogen concentration of 83 vol %) is directed through a second intake line 502. The high nitrogen concentration gas may be provided by injecting pure nitrogen directly into the second intake line 502 via a nitrogen injector 510. By directing different concentrations of nitrogen through different intake lines into the combustion chamber (e.g., during an intake stroke of the piston), a stratified environment of nitrogen may be provided in the combustion chamber. The varying shades demonstrate different mole fractions of nitrogen. As illustrated, the layers of nitrogen mole fractions range between 0.79 and 0.8. In some embodiments, a cylinder may have two intake ports as shown here. In other embodiments, a cylinder may have one intake port used for nitrogen stratification (e.g., where nitrogen is injected into a single intake port to the cylinder at a selected timing and selected amount and duration to provide a nitrogen stratified environment in the combustion chamber). As shown in Table 1 below, achieving nitrogen stratification via one intake port results in a reduction of NOx emissions by 42.4% relative to the non-NEA case.

Comparative simulations were repeated for analyzing performance of nitrogen stratification by intake nitrogen injection under the same operating conditions as the premixed NEA operating conditions described above. See Table 1 below for results for all of the comparative simulations conducted. In the comparative simulations, the nitrogen concentration in one of the intake ports was enriched to 83% and the nitrogen concentration is the other intake port remained at 79%, resulting in an average concentration of 81 vol % nitrogen in the combustion chamber, signifying an overall nitrogen enrichment of 2%. Nitrogen is injected during the intake stroke before the intake valve closure. Although the average nitrogen concentrations for the nitrogen stratified by intake nitrogen injection and premixed NEA combustion chambers were the same amount, the simulations demonstrated that the stratification by intake nitrogen injection reduced NOx emissions by 20.5% compared to the premixed NEA case.

TABLE 1

Summary of $NO_X$ reduction based on $N_2$ stratification in different regions for $N_2$ enrichment of 2%. Simulation results based on diesel engine operating at 1500 rpm and 10 bar IMEP

| Cases | $NO_X$ emission (g/kWh) | % $NO_X$ reduction compared to premixed case | % $NO_X$ reduction compared to non-NEA case |
|---|---|---|---|
| Reference (without NEA) | 1.58 | | |
| Premixed NEA | 1.15 | | |
| $N_2$ stratification in one of the intake port | 0.91 | 20.5 | 42.4 |
| $N_2$ stratification in the piston bowl | 1.06 | 7.7 | 32.9 |
| $N_2$ stratification in a cylindrical region from piston bowl to cylinder head | 0.85 | 25.9 | 46.2 |
| $N_2$ stratification in a spherical region around the injector | 0.79 | 31.2 | 50 |

TABLE 2

Summary of injection rate and injection duration in different regions for $N_2$ enrichment of 2%. Simulation results based on diesel engine operating at 1500 rpm and 10 bar IMEP.

| Regions | Injection rate | Injection duration |
|---|---|---|
| Spherical region | 3.9-15.6 mg/CAD | 2.5-10 CAD |
| Cylindrical region | 7.8-15.6 mg/CAD | 5-10 CAD |
| Piston bowl region | 7.8-15.6 mg/CAD | 5-10 CAD |
| Fuel injection | | 10 to 20 CAD |

According to embodiments of the present disclosure, nitrogen injected into a cylinder to create a nitrogen stratified combustion chamber may be provided from a nitrogen source that is fluidly connected to one or more nitrogen injectors used to inject the nitrogen into the cylinder. In some embodiments, a nitrogen source may be generated from a membrane-based system or a pressure swing adsorption system. Both generation methods require an air source that may be provided by an external air source, a turbocharger, or both. A membrane-based system may use a membrane with a high air recovery rate. A pressure swing adsorption system separates a targeted gas, in this case nitrogen, from a mixture of gases, or air, under a pressure based on nitrogen's affinity for an adsorbent material.

In one or more embodiments, following nitrogen injection into a selected region of a combustion chamber, fuel may be immediately and subsequently injected into the combustion chamber of the cylinder. The fuel in the stratified nitrogen environment is ignited and exhaust emissions are released from the combustion of the fuel during the exhaust stroke. The source of the injected fuel may be a fuel tank fluidly connected to a fuel injector. A range of fuels may be used in this application, including fossil-based (gasoline, ultra-low Sulfur diesel fuels, Heavy Fuel Oil, Marine Gasoil, Marine Diesel Oil, methane), carbon neutral fuels, and non-carbon fuels (Hydrogen, Ammonia).

Injection timing for injecting fuel and nitrogen may vary depending on, for example, how nitrogen is provided into the combustion chamber and the desired design of the nitrogen stratified environment to be provided in the combustion chamber. For example, in one or more embodiments having a nitrogen injector position around the cylinder to directly inject nitrogen into a selected partial region of the combustion chamber, such nitrogen injection may be timed to occur during the last half of a compression stroke of the piston. By directly injecting the nitrogen into the combustion chamber near the end of the compression stroke, there is less time for the piston to mix the nitrogen with other contents in the combustion chamber, thereby preserving a nitrogen stratified environment within the combustion chamber.

FIGS. 6A-7B show additional examples of engine operation methods that may be used in combination with different nitrogen injection designs.

Figure 6A:
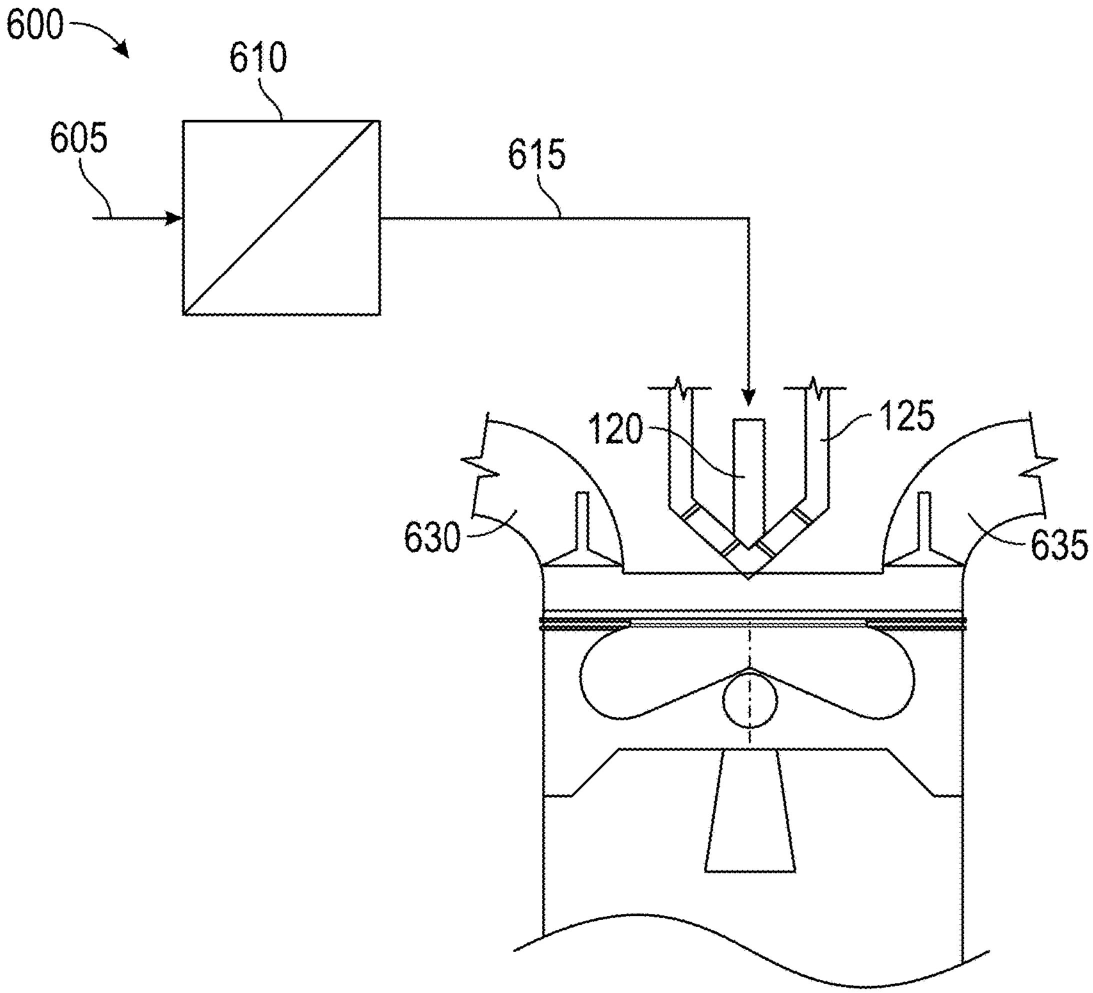
FIG. 6A is a cylinder with a multi-nozzle injector in accordance with one or more embodiments.

FIG. 6A shows an example of a cylinder 600 with a multi-nozzle injector including a fuel nozzle 125 and a nitrogen nozzle 120. The multi-nozzle injector is connected to the cylinder to inject fuel and nitrogen directly into the combustion chamber. Thus, the nitrogen injection location is separate from the air intake 630. An exhaust line 635 carries the combusted exhaust emissions to the ambient environment. A membrane-based system provides the nitrogen source for the nitrogen injection. The membrane-based system includes an air supply 605 (e.g., which may be supplied from a turbocharger in the engine system or an ambient air environment), where the air supply 605 directs air through a membrane 610 that filters nitrogen from the air. The resulting produced nitrogen 615 is then directed to the multi-nozzle injector to supply pure nitrogen to the combustion chamber via the nitrogen nozzle 120 of the multi-nozzle injector.

The multi-nozzle injector allows for the nitrogen and the fuel to be injected at a shared location into the cylinder. A multi-nozzle injector may contain a flow path through the center of the injector specifically for nitrogen and an outer flow path for the fuel circumferentially surrounding the center nitrogen flow path. In some embodiments, the center flow path may direct the fuel and the outer flow path may direct the nitrogen. By directing the nitrogen through the center flow path when targeting the piston bowl region, the spray angle is narrowed to confine the nitrogen injection and stratification to a specific region. By directing the nitrogen through the center path when targeting the top area of piston bowl to the cylinder head, as shown in FIG. 8C in red, known as the squish region, the spray angle may be widened. The squish region is the space between the top of the piston and the cylinder head. Regardless of which flow path the fuel and the nitrogen are directed through, both are injected into the combustion chamber from the same location via the multi-nozzle injector. In one or more embodiments, a multi-nozzle injector may be situated at the top of a cylinder, e.g., in a cylinder head.

Figure 6B:
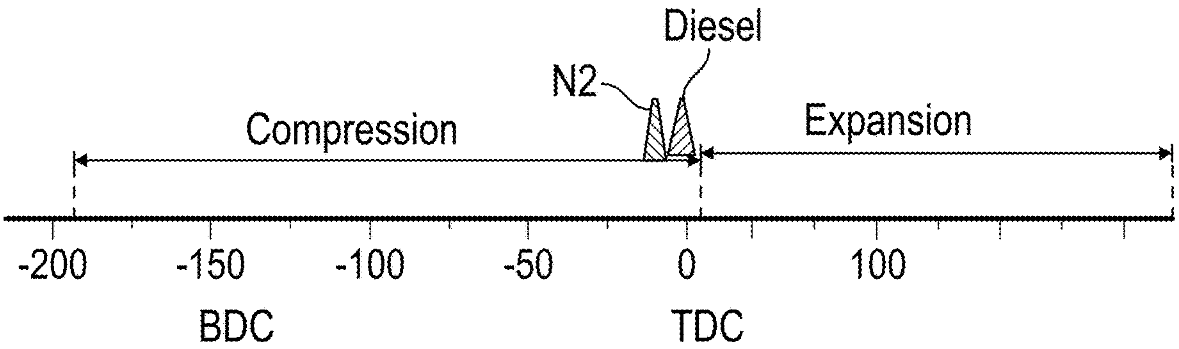
FIG. 6B is a diagram demonstrating nitrogen and fuel injection timing with a multi-nozzle injector in accordance with or more embodiments.

FIG. 6B shows a diagram demonstrating nitrogen and fuel injection timing based on the embodiment depicted in FIG. 6A. The nitrogen is injected first during the compression stroke around −10 to −20 crankshaft angle degrees (CAD) before top dead center (TDC) of the piston. Fuel is injected during the compression stroke between 0 CAD (at TDC) to −10 CAD (before TDC and after nitrogen injection).

Figure 7A:
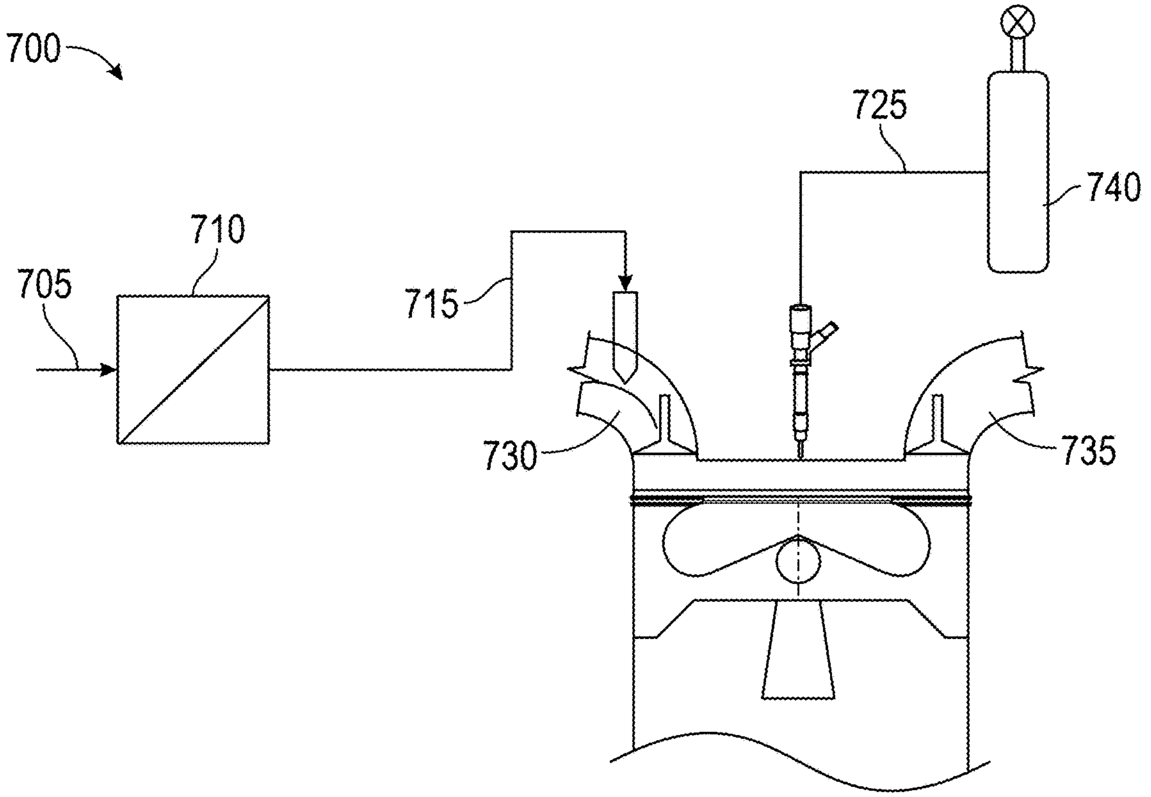
FIG. 7A is a cylinder with a separate nitrogen injector and a fuel injector in accordance with one or more embodiments.

FIG. 7A shows a cylinder 700 with a nitrogen injector 715 connected to and oriented to inject nitrogen into an air intake line 730. A membrane-based system is used as the nitrogen supply, where an air supply 705 is directed through a membrane 710 to produce pure nitrogen 715, and the produced nitrogen is injected through the nitrogen injector 715 into the air intake line 730. An exhaust line 735 carries the combusted exhaust emissions to the ambient environment. Fuel (e.g., diesel fuel) is supplied from a fuel tank 740 and is injected via a fuel injector 725 directly into the combustion chamber.

One or more air intake lines may be used to provide nitrogen into the combustion chamber. In some embodiments, each cylinder may have two air intakes (each air intake including an intake line, a fluidly connected intake port, and an intake valve), where each air intake may supply a different concentration of nitrogen into the combustion chamber. In embodiments with a single intake line, there may be a bifurcation in the cylinder head to split the flow between two intake valves. The nitrogen may be injected near the bifurcated region of the intake line. One or more nitrogen injectors are fluidly connected to a source of nitrogen and are installed in the air intake lines, to allow nitrogen to enter into the combustion chamber indirectly through the air intake lines.

Figure 7B:
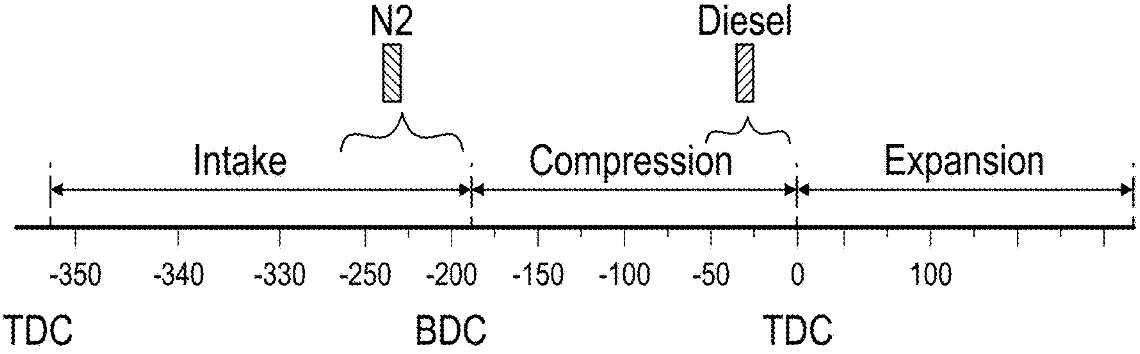
FIG. 7B is a diagram demonstrating nitrogen and fuel injection timing with a separate nitrogen injector and a fuel injector in accordance with or more embodiments.

FIG. 7B shows a diagram demonstrating nitrogen and fuel injection timing based on the embodiment depicted in FIG. 7A. The nitrogen is injected during the intake stroke immediately before the closure of the intake valves. The fuel is injected during the compression stroke.

Figure 8A:
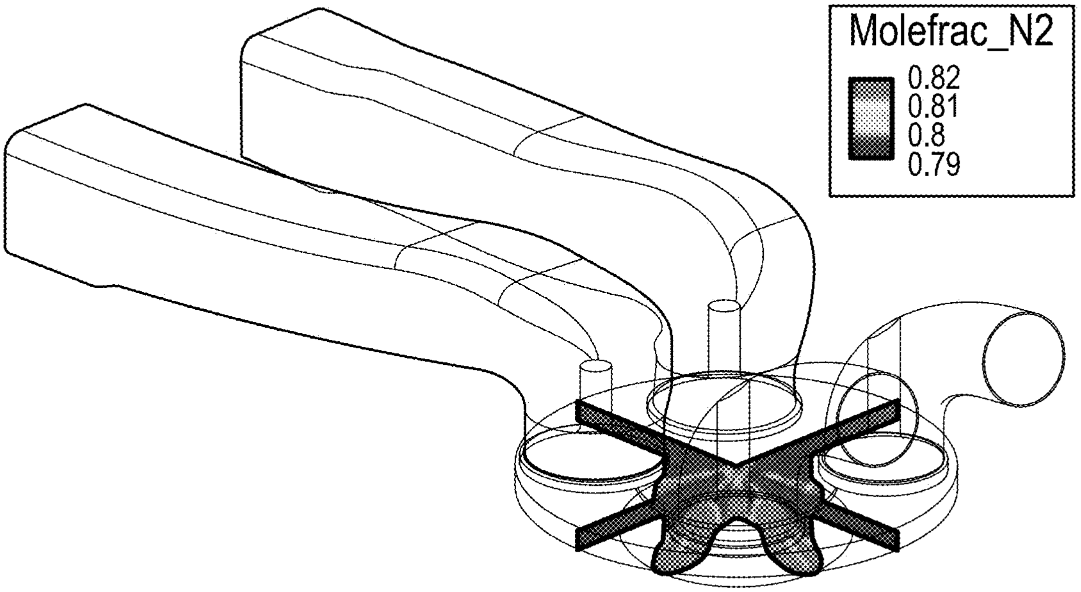
FIG. 8A is a schematic depicting nitrogen stratification using a multi-nozzle injector targeting the piston bowl in accordance with one or more embodiments.
Figure 8B:
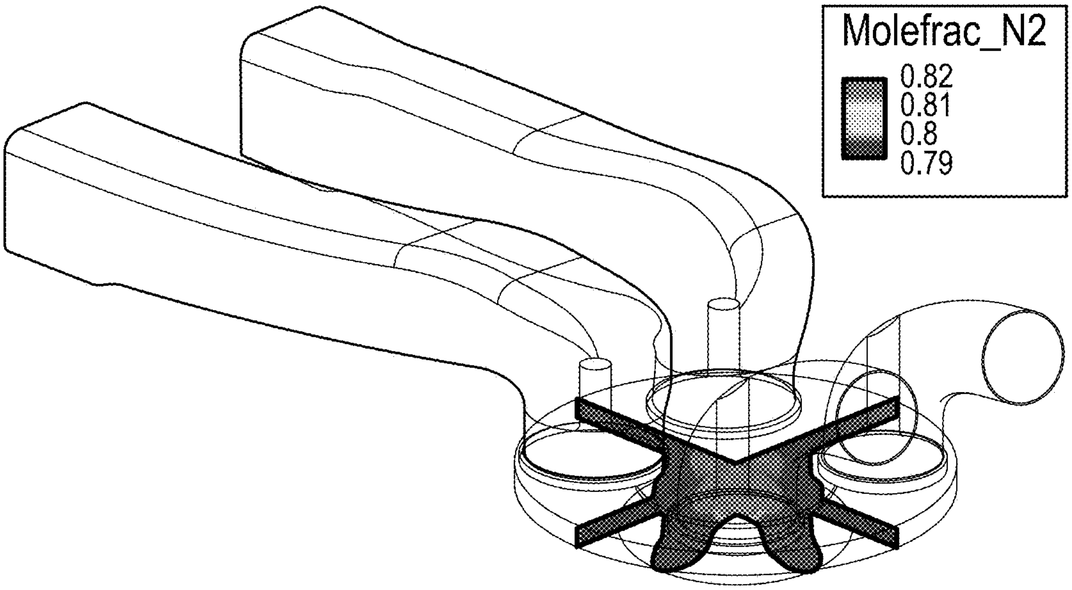
FIG. 8B is a schematic depicting nitrogen stratification using a multi-nozzle injector targeting a spherical region around an injector in accordance with one or more embodiments.
Figure 8C:
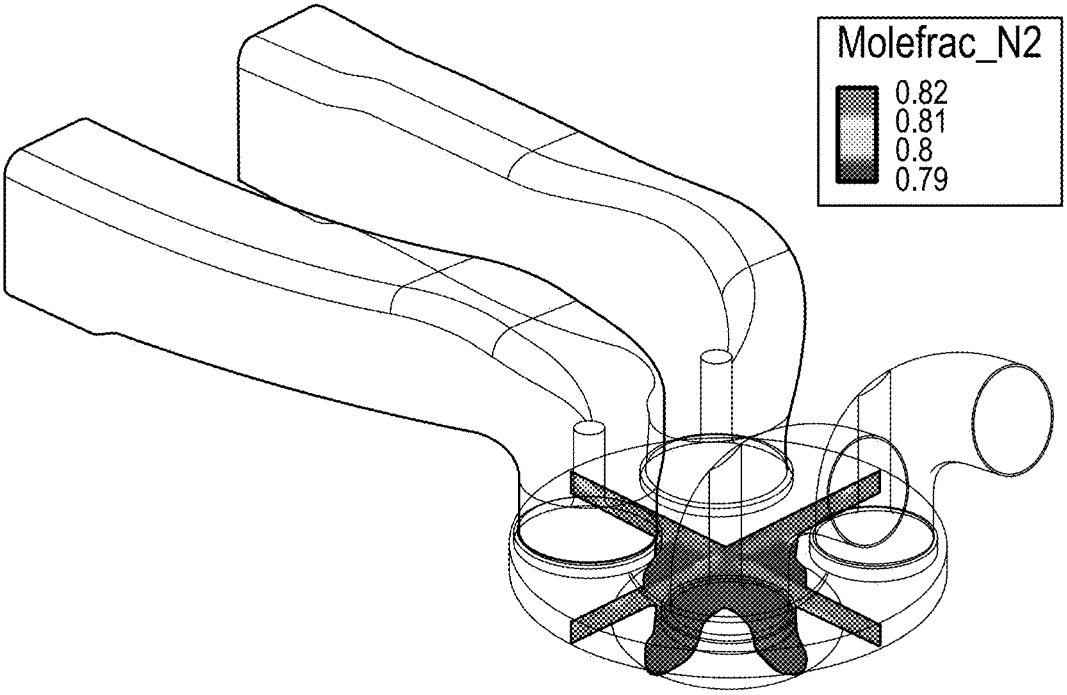
FIG. 8C is a schematic depicting nitrogen stratification using a multi-nozzle injector targeting a cylindrical region from a piston bowl to a top of a cylinder.

FIGS. 8A-8C illustrates targeted nitrogen stratification results from a simulation using a multi-nozzle injector. FIG. 8A demonstrates a narrow nitrogen injection spray angle (e.g., ranging from 90 to 120 degrees) targeting the piston bowl to increase nitrogen concentration in the piston bowl region. FIG. 8B demonstrates a slow nitrogen injection right before the main fuel injection to increase nitrogen concentration around the fuel injector, forming a spherical shape. FIG. 8C demonstrates a wide nitrogen injection spray angle (e.g., ranging from 160 to 180 degrees) targeting the squish zone to increase nitrogen concentration in the head of the piston and the top of the cylinder.

While stratified NEA offers the advantage of greater reduction in NOx emissions, it also offers other benefits in terms of system level parameters. Assume that 2% nitrogen enrichment is the maximum requirement to meet the International Maritime Organization (IMO) NOx reduction target (for Tier 3 compliance) for Marine engine application. Based on the cylinder region stratification method described herein (where a high nitrogen concentration region is provided in a cylinder region from piston bowl to top of the cylinder), stratified NEA reduced NOx emissions by 25% more than NOx emission reduction from premixed NEA. With this benefit, the nitrogen injection amount required for meeting the Tier 3 NOx emission target is only 1.5 vol % addition and not 2 vol % addition as required for the premixed NEA case.

Additionally, stratified NEA systems and methods can reduce the nitrogen flow required to be supplied to the engine compared to premixed NEA systems and methods. This in turn reduces the feed air flow required for membrane-based nitrogen sources at the membrane inlet, thereby reducing the power requirement.

For illustration purposes, a 6-cylinder marine engine that produces 1200 kW is considered. At 100% load, the engine operates at a maximum air flow of 2.4 kg/s and pressure of 5.5 bar. Atmospheric air contains 79 vol % nitrogen and 21 vol % oxygen. If 2 vol % of nitrogen is enriched in the intake air, the total nitrogen concentration increases to 81 vol %. For enriching nitrogen to 81 vol % in the engine via premixed NEA methods, the flow calculations indicate that the nitrogen flow required is 0.2 kg/s. If 99% membrane purity is selected for a membrane-based nitrogen source, the feed air required at the membrane inlet is 0.6 kg/s. Note that there is a flow and pressure loss across the membrane and the air separation is based on the recovery rate of membranes. Based on the recovery rate of 33% for the membrane module, the air flow requirement at the membrane inlet is calculated to be 0.6 kg/s. To feed the membrane inlet at a constant air flow rate of 0.6 kg/s, the power consumption of external compressor is 150 kW. With stratified NEA systems and methods, nitrogen may be enriched only up to 1.5% in order to comply with the Tier 3 NOx compliance. With this, the nitrogen required for 1.5% enrichment is calculated to be 0.15 kg/s, which is lower than the premixed NEA flow requirement. For producing 0.15 kg/s of nitrogen, the feed air required at the membrane inlet is reduced to 0.45 kg/s, calculated based on the membrane recovery rate. The power required for producing this air flow is reduced to 112.5 kW, reducing the burden on the externally operated compressor, and thereby reducing the operational cost.

In addition to the power consumption, reduction in required nitrogen flow also impacts the number of membranes required for membrane-based nitrogen sources, as the nitrogen production capacity is related to the number of membranes required for the system. The nitrogen production capacity of one membrane module is 0.02 kg/s when choosing 99% membrane purity. In order to produce 0.2 kg/s of $N_2$ with premixed NEA, the total number of membranes required is 0.2/0.02=10. Note that the nitrogen requirements for meeting the NOx emissions compliance is 0.15 kg/s with stratified NEA system. Therefore, the total number of membranes required for stratified NEA systems may be reduced to 0.15/0.02=7. Thus, in addition to reducing the power consumption, the number of required membranes for membrane-based nitrogen sources are also reduced with stratified NEA systems when compared to premixed NEA systems, thereby further decreasing the costs of the overall system. With a reduced number of membranes for the stratified NEA system, the overall weight of the system is also decreased compared to the premixed NEA system. Results shown in Table 3 below indicate that less power is needed, less membranes, and the overall weight of the system is reduced by 20% when using nitrogen stratification according to embodiments of the present disclosure.

TABLE 3

Calculations comparing premixed NEA to stratified NEA systems

| System parameters | Premixed NEA | Stratified NEA |
|---|---|---|
| Power consumption (KW) | 150 | 112.5 |
| No of membranes | 10 | 7 |
| Weight (Tons) | 5 | 4 |

Embodiments of the present disclosure may provide at least one of the following advantages. Nitrogen stratification reduces the NOx emissions exiting an internal combustion engine. Additionally, by reducing NOx emissions significantly using stratification rather than premixed enriched nitrogen, the amount of nitrogen needed to reduce NOx emissions by a given amount is decreased. This reduces the flow required from the air supply and through the membranes, ultimately reducing power requirements for the system, reducing the number of membranes needed, the system weight, and lowering the costs of operating the system.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

Although only a few example embodiments have been described in detail above, those skilled in the art will readily appreciate that many modifications are possible in the example embodiments without materially departing from this invention. In addition, many modifications will be appreciated by those skilled in the art to adapt a particular instrument, situation, or material to embodiments of the disclosure without departing from the essential scope thereof. Accordingly, all such modifications are intended to be included within the scope of this disclosure as defined in the following claims.

Furthermore, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by one or more embodiments described herein. At the very least, and not as an attempt to limit the application of the doctrine of equivalents to the scope of the claim, each numerical parameter should at least be construed in light of the number of reported significant digits and by applying ordinary rounding techniques.

What is claimed:

1. A method for injecting nitrogen into an internal combustion engine cylinder, comprising:

moving a piston axially back and forth in a cylinder of an internal combustion engine between a top dead center position and a bottom dead center position in a cycle, the cycle comprising:

an intake stroke;

a compression stroke;

a combustion stroke; and
an exhaust stroke;
injecting pure nitrogen into a combustion chamber of the cylinder before the piston reaches top dead center during the compression stroke;
injecting fuel into the combustion chamber of the cylinder;
wherein the pure nitrogen and the fuel are injected into different regions of the combustion chamber to create a stratified gas environment with a high nitrogen concentration region and a low nitrogen concentration region within the combustion chamber;
igniting the fuel in the stratified gas environment; and
releasing an amount of exhaust emissions from combustion of the fuel during the exhaust stroke.

2. The method of claim 1, wherein the pure nitrogen injecting uses one or more nitrogen injectors.

3. The method of claim 2, wherein the one or more nitrogen injectors are located on a top of the cylinder, a side of the cylinder, or combinations thereof.

4. The method of claim 1, wherein the pure nitrogen is injected from a top of the cylinder into a bowl region on a head of the piston to provide the stratified gas environment with a higher concentration of nitrogen in the bowl region relative to remaining regions in the combustion chamber.

5. The method of claim 4, wherein the higher concentration of nitrogen is concentrated in the bowl region by injecting the pure nitrogen with a spray angle ranging from 90 to 120 degrees and at a nitrogen injection timing ranging from 10 to 20 crank angle degrees before a fuel injection timing for injecting the fuel.

6. The method of claim 1, wherein the pure nitrogen is injected from a top of the cylinder into the combustion chamber with a spray angle ranging from 160 to 180 degrees at a nitrogen injection timing ranging from 10 to 20 crank angle degrees before a fuel injection timing for injecting the fuel to provide the stratified gas environment with a higher concentration of nitrogen in a cylindrical region in the combustion chamber relative to remaining regions in the combustion chamber, wherein the cylindrical region of the high concentration of nitrogen extends centrally through the combustion chamber between a head of the piston and the top of the cylinder.

7. The method of claim 1, wherein the pure nitrogen is injected from a nitrogen injector at a top of the cylinder into the combustion chamber to provide the stratified gas environment with a higher concentration of nitrogen in a spherical region around the nitrogen injector to provide the stratified gas environment with a higher concentration of nitrogen in the spherical region relative to remaining regions in the combustion chamber.

8. The method of claim 3, wherein the stratified gas environment comprises a higher concentration of nitrogen in a region of the cylinder based on the location of the one or more nitrogen injectors.

9. The method of claim 1, wherein the pure nitrogen is generated from a membrane-based system.

10. The method of claim 1, wherein the pure nitrogen is generated from a pressure swing adsorption system.

11. The method of claim 1, further comprising:
providing air to a nitrogen generation system from an external air source, a turbocharger, or a combination thereof; and
generating the pure nitrogen from the nitrogen generation system.

12. An engine system for injecting nitrogen into an internal combustion engine, comprising:
a cylinder comprising a combustion chamber and a piston slidably positioned in the cylinder;
a first intake line fluidly connected to the combustion chamber via a first intake port;
one or more nitrogen injectors fluidly connecting a source of pure nitrogen to the combustion chamber;
a fuel injector fluidly connecting a fuel source to the combustion chamber;
wherein the one or more nitrogen injectors provide nitrogen to the combustion chamber to create a stratified gas environment with a high nitrogen concentration region and a low nitrogen concentration region within the combustion chamber.

13. The engine system of claim 12, wherein the source of pure nitrogen comprises a membrane-based system.

14. The engine system of claim 12, wherein the source of pure nitrogen comprises a pressure swing adsorption system.

15. The engine system of claim 12, wherein when a first of the one or more nitrogen injectors is in an open configuration, a second nitrogen injector is in a closed configuration, and when the second nitrogen injector is in the open configuration, the first nitrogen injector is in the closed configuration.

16. The engine system of claim 12, wherein the one or more nitrogen injectors are located on a top of the cylinder, a side of the cylinder, or combinations thereof.

17. An engine system for injecting nitrogen into an internal combustion engine, comprising:
a cylinder comprising a combustion chamber and a piston slidably positioned in the cylinder;
an intake line fluidly connected to the combustion chamber via an intake port; and
a multi-nozzle injector connected to the cylinder, the multi-nozzle injector comprising:
a fuel nozzle fluidly connecting a fuel source to the combustion chamber; and
a nitrogen nozzle fluidly connecting a source of pure nitrogen to the combustion chamber.

18. The engine system of claim 17, wherein the fuel nozzle circumferentially surrounds the nitrogen nozzle.

19. The engine system of claim 17, wherein the multi-nozzle injector is located on a top of the cylinder.

20. An engine system for injecting nitrogen into an internal combustion engine, comprising:
a cylinder comprising a combustion chamber and a piston slidably positioned in the cylinder;
one or more nitrogen injectors fluidly connecting a source of pure nitrogen to a first and a second intake line;
the first intake line fluidly connected to the combustion chamber via a first intake port configured to direct air with atmospheric concentrations of nitrogen to the combustion chamber;
the second intake line fluidly connected to the combustion chamber via a second intake port configured to direct the pure nitrogen to the combustion chamber; and
a fuel injector fluidly connecting a fuel source to the combustion chamber.

* * * * *